J. H. SMITH.
Manufacture of Garden-Rakes.
No. 221,624. Patented Nov. 11, 1879.
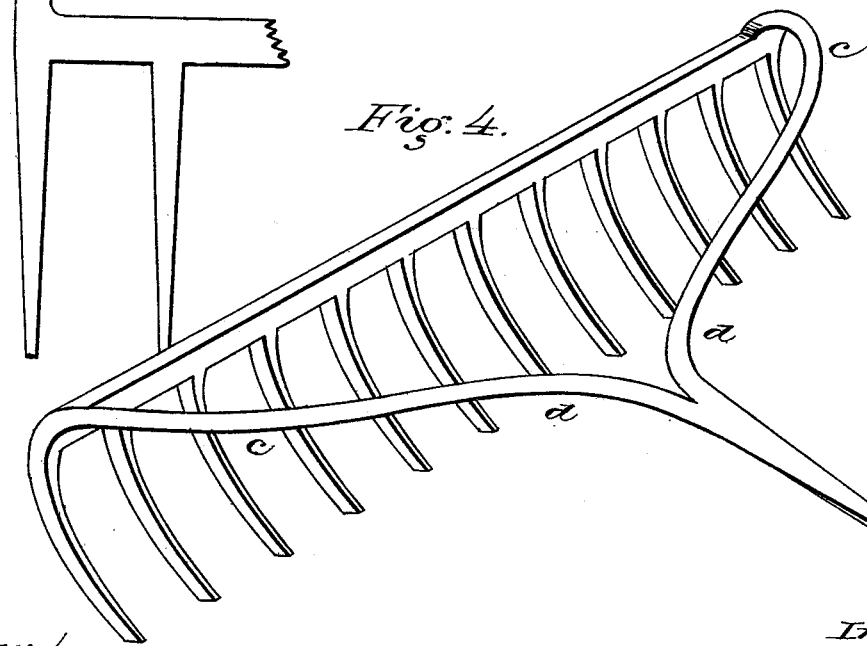

UNITED STATES PATENT OFFICE.

JOHN H. SMITH, OF JACKSON, MICHIGAN, ASSIGNOR TO THE WITHINGTON & COOLEY MANUFACTURING COMPANY, OF SAME PLACE.

IMPROVEMENT IN THE MANUFACTURE OF GARDEN-RAKES.

Specification forming part of Letters Patent No. 221,624, dated November 11, 1879; application filed August 12, 1878.

*To all whom it may concern:*

Be it known that I, JOHN H. SMITH, of the city of Jackson, in the county of Jackson and State of Michigan, have invented a new and useful Improvement in the Manufacture of Garden-Rakes, of which the following is a specification.

The invention relates to that class of rakes made of cast-steel by cutting and drawing the teeth from one edge of a bar of steel, while the other edge forms the head or bar of rake.

Heretofore such rakes have been made with a shank projecting from the side of the rake-head between the two middle teeth, either by welding on an iron shank or by forging a shank solid to the rake at same point by a recent improvement, which improvement is believed to be the invention of C. T. Beebe, of Jackson, Michigan.

The object of my invention is to furnish a solid-shank cast-steel brace-rake, the rake, braces, and shank all being forged from one and the same piece of steel.

My invention consists in drawing from a portion of the rake-pattern, purposely left on each end of rake-head after cutting and drawing the teeth of same in the usual way, two long slender pieces, much like fork-tines in shape and size, which, being bent into position, are united at the end and form at once braces and shank for the rake.

In the accompanying drawings, in which similar letters refer to like parts, Figure 1 is a part of the pattern of steel from which the rake is made, with the teeth *a a a*, &c., cut ready to be turned out and drawn, the end *b* being that part from which one of the braces is drawn. Fig. 2 shows the outer tooth of rake and the brace *c d* drawn on the end of rake-head. Fig. 3 shows the brace after being bent and upset so that it projects from the top edge of rake-head instead of from the end of same. Fig. 4 shows the finished rake in perspective.

In the manufacture of this rake the first operation, after cutting from a bar of steel of proper size a pattern of desired length, is to cut the teeth, as shown at *a a*, &c., Fig. 1, leaving enough stock at each end of the pattern, as shown at *b*, to make the braces. The teeth *a a*, &c., are then turned out and drawn in the usual way; next the braces are drawn projecting from the two ends of the rake-head, one being shown by Fig. 2; next the braces are bent and upset next the head of rake, so that they project from the top edge of rake-head directly opposite the last tooth on each end of rake, one being shown by Fig. 3 at H. Both the braces being drawn, in the next operation the two ends *d d* are brought together and welded, the same being bent to form the braces and shank, as shown by Fig. 4.

It is preferable in this rake that the teeth should be curved. The braces are also curved, both vertically and horizontally, all tending to give the rake an open roomy appearance. At the same time the braces make it a stronger rake without making bad corners to be clogged up in use.

The head of rake is in especially good shape for using the back of rake, as the sides of the bar are inclined to the surface of the ground, and it is therefore more easily pushed along than the ordinary rake.

Other advantages in making this rake are, first, the fact that the teeth are all cut one way, and at same time without turning the pattern; second, setting down the space between the two middle teeth for attaching shank is avoided; third, while in ordinary rakes it is necessary to make an even number of teeth, in this an odd or even number may be had at pleasure.

What I claim is—

1. That improvement in the art of manufacturing garden-rakes which consists in cutting the blank, as shown in Fig. 1, drawing out the end portions, *b*, bending them back, and uniting them to form the shank of the rake, as and for the purpose set forth.

2. As an article of manufacture, a rake provided with braces extending from the ends of the head backward and united to form the shank, said braces being integral with the head, as and for the purpose set forth.

J. H. SMITH.

Witnesses:
L. D. WELLING,
GEO. D. WALCOTT.